No. 886,856. PATENTED MAY 5, 1908.
E. F. PRICE.
ELECTRIC FURNACE.
APPLICATION FILED NOV. 14, 1905.
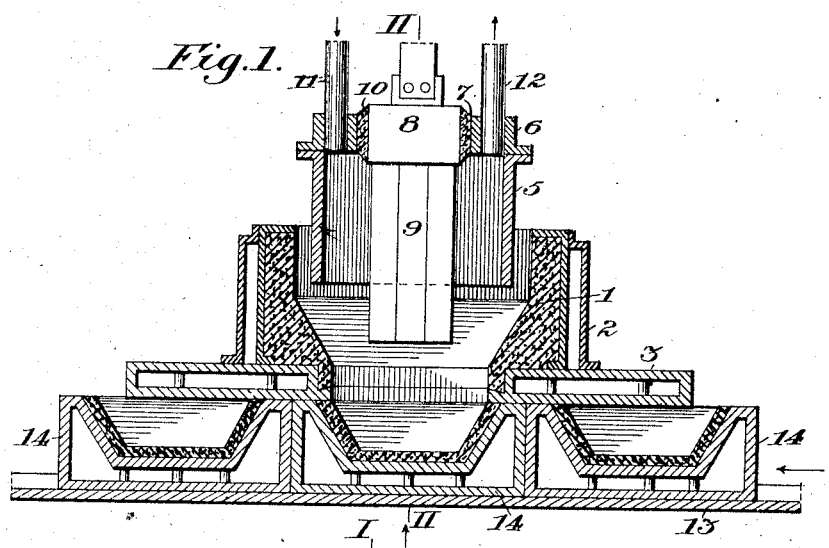
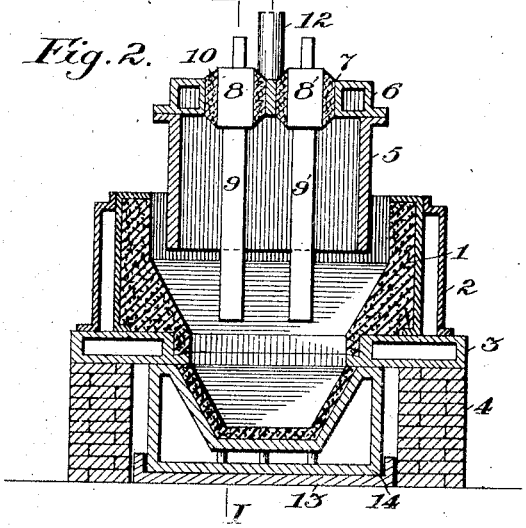

UNITED STATES PATENT OFFICE.

EDGAR F. PRICE, OF NIAGARA FALLS, NEW YORK, ASSIGNOR, BY MESNE ASSIGNMENTS, TO CENTRAL TRUST COMPANY OF NEW YORK, TRUSTEE, A CORPORATION OF NEW YORK

ELECTRIC FURNACE.

No. 886,856.            Specification of Letters Patent.            Patented May 5, 1908.

Application filed November 14, 1905. Serial No. 287,345.

*To all whom it may concern:*

Be it known that I, EDGAR F. PRICE, a citizen of the United States, residing at Niagara Falls, in the county of Niagara and State of New York, have invented certain new and useful Improvements in Electric Furnaces, of which the following is a specification.

The present invention is an electric arc furnace for smelting refractory ores and producing ferro-alloys, calcium carbid, etc.

The furnace has an open bottom beneath which is a movable receptacle which receives the molten product and is shifted to withdraw its contents from the product remaining in the furnace. A series of separate receptacles is employed, each serving in turn as the hearth or crucible of the furnace.

Referring to the accompanying drawings—Figure 1 is a longitudinal vertical section of the furnace on the line 1—1 of Fig. 2; Fig. 2 is a transverse vertical section on the line 2—2 of Fig. 1.

The furnace shown in Figs. 1, 2 comprises a stationary, vertical smelting chamber having side walls 1 of refractory material such as magnesia or siloxicon firebrick, surrounded by a water-jacket 2. Beneath and supporting the firebrick is a base-plate 3, which preferably consists of a rectangular steel casting, containing a water chamber. This base-plate has a rectangular central opening which is in alinement with the downwardly-converging lower portion of the firebrick walls. The base-plate is supported on piers 4. Above the furnace and depending into the smelting chamber is a metal hood 5, the upper end of which is closed by a plate 6 having parallel openings 7 which receive the holders and terminals 8, 8 of the electrodes 9, 9'. A layer 10 of insulating refractory material is interposed between the electrode holders and the walls of the openings. Pipes 11, 12 for supplying the charge-materials and delivering the reaction gases extend through the top-plate.

Beneath the smelting chamber and movably supported on a metal plate 13 having side flanges is a series of separate receptacles 14. Each of these receptacles preferably consists of a rectangular water-cooled steel casting having inclosing sides and a refractory lining. Each receptacle when moved into alinement with the rectangular opening in the base-plate 3, constitutes the hearth or crucible of the furnace. The transverse adjacent edges of the several receptacles are in contact and the upper edges of the receptacles are flat and smooth and fit closely against the lower flat smooth face of the base-plate 3.

In employing this furnace for the production, for example, of calcium carbid, charge-materials are fed into the hood and thence into the working chamber and are smelted by electric arcs, as in the well known Horry furnace, the electrodes 9, 9' being of opposite polarity. The reduced carbid gradually accumulates in the receptacle 14 which is beneath the smelting chamber and when this receptacle is filled it is moved out from beneath the furnace and the adjacent receptacle is simultaneously moved into position to receive another body of carbid. The filled receptacles are discharged as they leave the furnace, as by inverting them, and are then ready for further use. The movement of the receptacles may be effected either by applying pressure to the empty receptacles at one end of the series, or by connecting the several receptacles and applying traction to the filled receptacle at the other end of the series. If desired, the receptacles may constitute an endless chain.

I claim:—

1. An electric furnace, comprising a smelting chamber having a discharge opening, and a receptacle having inclosing sides, said receptacle arranged to receive the molten furnace-product and act as a bottom for the furnace, and being movable transversely across said discharge opening.

2. An electric furnace, comprising a smelting chamber having a discharge opening, and a plurality of separate inclosed receptacles movable transversely across said opening and arranged to retain a molten body within said chamber.

3. An electric furnace, comprising a smelting chamber having a discharge opening, and a plurality of separate inclosed abutting receptacles movable transversely across said opening and arranged to retain a molten body within said chamber.

4. An electric furnace, comprising a smelting chamber having an open bottom, and a receptacle having inclosing sides, said receptacle arranged to receive the molten-furnace product and act as a bottom for the furnace, and being movable transversely across said discharge opening.

5. An electric furnace, comprising a smelting chamber having an open bottom, and a plurality of separate inclosed receptacles movable transversely beneath and across said bottom and arranged to retain a molten body within said chamber.

6. An electric furnace, comprising a smelting chamber having an open bottom, and a plurality of separate inclosed abutting receptacles movable transversely beneath and across said bottom and arranged to retain a molten body within said chamber.

7. An electric furnace, comprising a smelting chamber having an open bottom, electrodes extending into said chamber, and a receptacle having inclosed sides, said receptacle arranged to receive the molten furnace-product and act as a bottom for the furnace, and being movable transversely across said discharge opening.

8. An electric furnace, comprising a smelting chamber having an open bottom, electrodes extending into said chamber, and a plurality of separate inclosed receptacles movable transversely beneath and across said bottom and arranged to retain a molten body within said chamber.

9. An electric furnace, comprising a smelting chamber having an open bottom, electrodes extending into said chamber, and a plurality of separate inclosed abutting receptacles movable transversely beneath and across said bottom and arranged to retain a molten body within said chamber.

In testimony whereof, I affix my signature in presence of two witnesses.

EDGAR F. PRICE.

Witnesses:
  G. E. Cox,
  D. Burgess.